(12) United States Patent
Wyrwas

(10) Patent No.: US 6,771,627 B1
(45) Date of Patent: Aug. 3, 2004

(54) METHOD OF OPERATING A MOBILE STATION FOR DIVERSITY COMMUNICATION

(75) Inventor: Richard Wyrwas, London (GB)

(73) Assignee: ICO Services Limited, London (GB)

( * ) Notice: Subject to any disclaimer, the term of this patent is extended or adjusted under 35 U.S.C. 154(b) by 0 days.

(21) Appl. No.: 09/302,041

(22) Filed: Apr. 29, 1999

Related U.S. Application Data

(63) Continuation-in-part of application No. 08/951,078, filed on Oct. 15, 1997, now abandoned.

(51) Int. Cl.[7] ............................................. H04B 7/212
(52) U.S. Cl. ........................ 370/337; 370/477; 455/450
(58) Field of Search ................................ 370/337, 347, 370/321, 329, 315, 316, 252, 465, 468, 477; 455/11.1, 12.1, 13.1, 450

(56) References Cited

U.S. PATENT DOCUMENTS

| | | | |
|---|---|---|---|
| 5,103,459 A | | 4/1992 | Gilhousen et al. |
| 5,212,684 A | | 5/1993 | MacNamee et al. |
| 5,563,606 A | | 10/1996 | Wang |
| 5,796,777 A | * | 8/1998 | Terlep et al. ................ 375/227 |
| 5,799,042 A | * | 8/1998 | Xiao ........................... 375/285 |
| 6,084,865 A | * | 7/2000 | Dent ........................... 370/321 |
| 6,236,855 B1 | * | 5/2001 | Austin ........................ 455/423 |

FOREIGN PATENT DOCUMENTS

| | | |
|---|---|---|
| EP | 0468569 | 1/1992 |
| EP | 0702462 | 3/1996 |
| GB | 990139 | 4/1965 |
| GB | 1088261 | 10/1967 |

* cited by examiner

*Primary Examiner*—Erika Gary
(74) *Attorney, Agent, or Firm*—Michael J. Donohue; Davis Wright Tremaine LLP

(57) ABSTRACT

In a communication system, a base station (1) transmits to a mobile station (5) in different channels. One channel is relayed to the mobile station (5) by a first satellite (3) and the other is relayed by a second satellite (4). The mobile unit (5) compares the qualities of the signals relayed by the satellites (3, 4) and transmits back to the base station (1) using the satellite (3,4) providing the best quality signals. The use of satellite links is not essential. The system has the advantages of diversity communication without increasing power demand at the mobile station.

6 Claims, 5 Drawing Sheets

METHOD OF OPERATING A MOBILE STATION FOR DIVERSITY COMMUNICATION

PRIORITY

This is a continuation-in-part application of U.S. patent application Ser. No. 08/951,078 filed on Oct. 15, 1997, now abandoned.

FIELD OF THE INVENTION

The present invention relates to a method of operating a TDMA mobile station so as to transmit speech in a return path channel corresponding to the better of two forward path channels.

BACKGROUND OF THE INVENTION

In communication systems, particularly those where one station is mobile, the quality of signals received from a channel can vary from time to time, sometimes dropping to the point where a signal becomes unusable due to noise or even disappears. A known solution to this problem is to transmit the same information over two or more channels. The likelihood of the signals in all of the channels being unusable at the same time is much lower than the likelihood of one channel being unusable. The likelihood is further reduced if the physical properties, e.g. carrier frequencies or paths, of the channels differ significantly.

In is known for a base station and a mobile system to transmit in two or more manners. Since substantially the same power must be radiated for each manner of transmission in such a system as would be radiated for the single manner used in a simple system, the power requirements of the stations are increased when diversity is employed. With modern low-power signal processing circuitry, the extra power required by the station's rf power amplifier can almost double the power consumption of a station as a whole even when using only two-fold diversity. This problem is particularly acute in the case of battery powered equipment such as handheld mobile telephones.

SUMMARY OF THE INVENTION

According to the present invention, there is provided a method of operating a TDMA mobile station so as to transmit speech in a return path channel corresponding to the better of two forward path channels, the method including:

during one frame's duration, digitizing user speech and storing the resultant digitized user speech data;

during one frame's duration, coding digitized user speech data, produced in the preceding frame and storing the encoded digitized user speech data;

tuning to receive bursts from two paths and then demodulating the bursts;

decoding the demodulated bursts to produce time-compressed, error-corrected audio data and a value for the BER (bit error rate) of each said burst;

comparing the BER values to determine the lower at the end of a frame;

expanding the time-compressed audio data, received in the preceding frame to which the lower BER relates converting the expanded audio data into an analogue signal and generating an acoustic signal in dependence thereon; and transmitting the the encoded digitized user speech data via the return path corresponding to the forward path followed by the burst having the lower BER in the preceding frame.

Preferably, the user speech is digitized by a DSP module provided in the mobile station.

Preferably, the digitized user speech data is coded by a DSP module provided in the mobile station.

Preferably, said tuning is performed by outputting from a controller, provided in the mobile station, frequency control data to a frequency sythesizer, provided in the mobile station.

Preferably, the decoding is performed by a DSP module provided in the mobile station.

Preferably, said comparing of BER values is performed by a controller provided in the mobile station.

DESCRIPTION OF PREFERRED EMBODIMENTS

Embodiments of the present invention will now be described, by way of example, with reference to the accompanying drawings.

Figure 1:
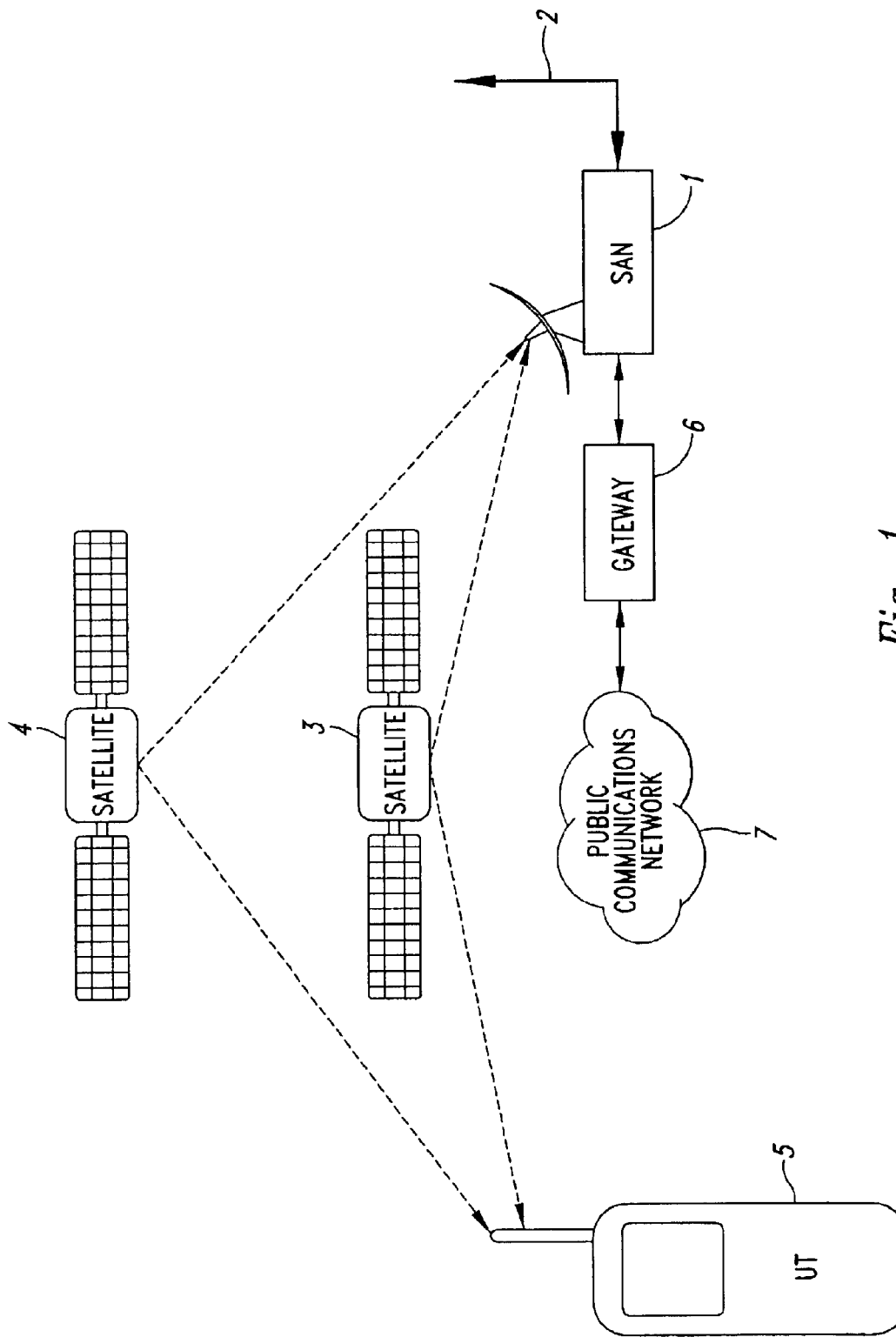
FIG. 1 shows the main elements of a satellite-based mobile telephone system according to the present invention.

Referring to FIG. 1, a satellite access node (SAN) 1 is connected to other SANs and administrative centers by a high-speed terrestrial data network 2. Two satellites 3, 4 carry transponders so that the SAN 1 can communicate with a mobile telephone (UT) 5. The satellites 3, 4 are members of a constellation of similar satellites in non-geostationary orbits. The SAN 1 is further connected to a gateway (GW) 6 to the terrestrial public communications networks 7, e.g., the public switched telephone network (PSTN) and the integrated services digital network (ISDN).

The present invention is concerned primarily with the SAN to UT link. Therefore, the architecture of the rest of the satellite telephone system will not be described further. However, further information can be obtained from "Satellite Communications Systems", 2nd Ed., Maral, G. and Bousquet, M., Wiley 1993 (ISBN 471 93032 6).

The SAN 1 to satellite 3, 4 uplinks are located in a band in the region of 5 GHz and the corresponding downlinks are in a band in the region of 7 GHz. The satellite 3, 4 to UT 5 downlinks are located in a band in the region of 2.1 GHz and the corresponding uplinks are in a band in the region of 1.9 GHz.

Each satellite 3, 4 has a plurality of redirectable antennas. The antennas are controlled such that the footprint of each will remain fixed on a particular geographical area or "cell" as the satellite passes from horizon to horizon. Each "cell" is covered simultaneously by both satellites 3, 4. As a satellite 3, 4 approaches the horizon, its antennas are redirected to provide coverage of an adjacent region while another satellite takes over the region being left. Each antenna is allocated different frequencies to those allocated to antennas covering neighbouring areas. Although only a relatively small number of frequencies are used by each antenna, the number of channels is increased by use of a TDMA scheme as illustrated in FIG. 2.

Figure 2:
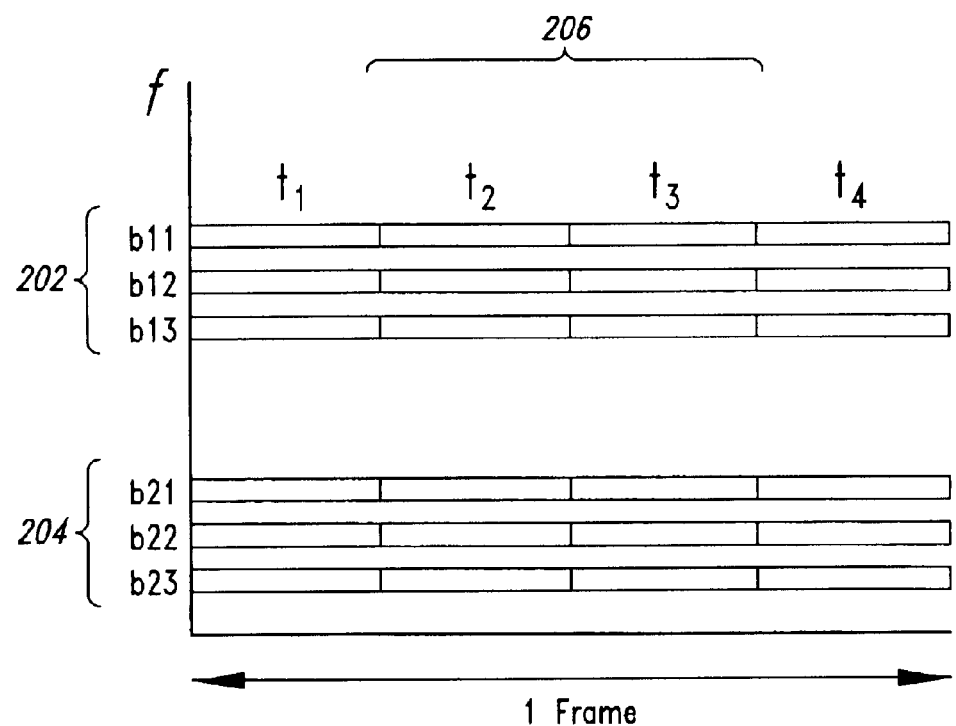
FIG. 2 illustrates the allocation of channels to the satellites shown in FIG. 1.
Figure 2:
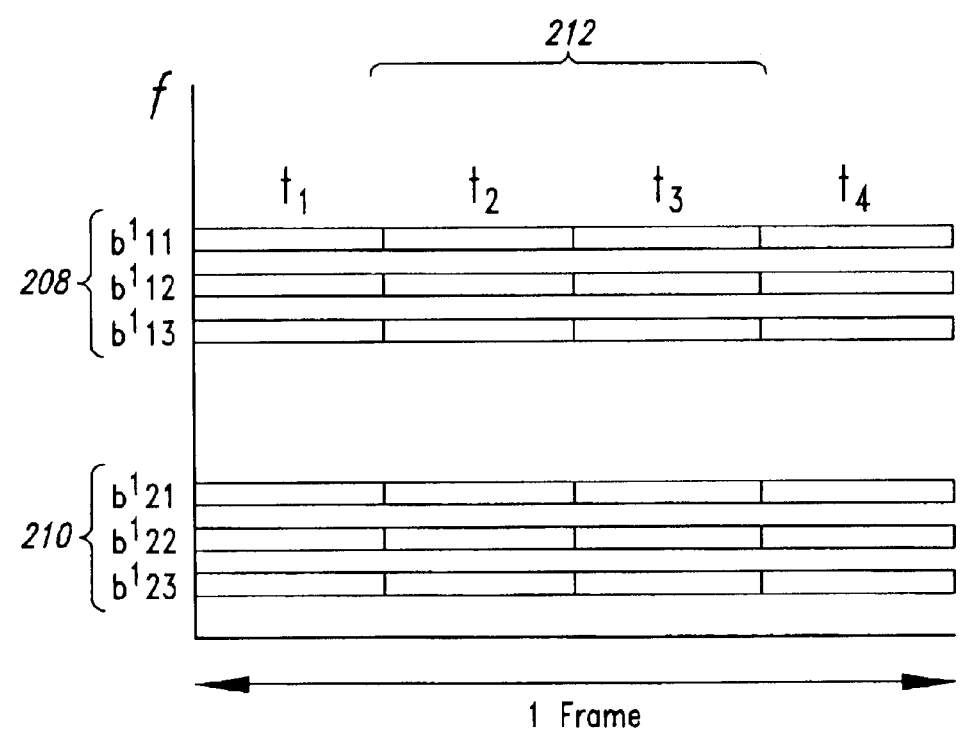

Referring to FIG. 2, the link from the SAN 1, via the first satellite 3, to UTs 5 is provided by three sub-bands $b_{11}$, $b_{12}$, $b_{13}$ 202. The corresponding UT-to-SAN link is provided by three sub-bands $b_{21}$, $b_{22}$, $b_{23}$ 204. Each TDMA frame is divided into four time slots $t_1$, $t_2$, $t_3$, $t_4$, 206 which are used by respective channels. For a given channel the SAN-to-UT link uses one time slot, e.g. $_2$ $t_1$ in one of bands $b_{11}$, $b_{12}$, $b_{13}$ 202, and another time slot, e.g.,$_2$ $t_3$ in one of bands $b_{21}$, $b_{22}$, $b_{23}$ 204, is used for the UT-to-SAN link. It is preferred that the UT-to-SAN and SAN-to-UT links, used by one channel, do not use the same time slot.

Communication between UTs 5 and the second satellite 4 is similarly arranged using sub-bands $b'_{11}$, $b'_{12}$, $b'_{13}$ 208 and $b'_{21}$, $b'_{22}$, $b'_{23}$ 210.

"Sub-band" herein refers to the sub-bands in both the SAN-to-satellite link bands and the satellite-to-UT bands.

Each SAN-to-UT and UT-to-SAN link combination of the first satellite 3 is paired with a SAN-to-UT and UT-to-SAN link combination of the second satellite 4. In establishing these pairs, it is preferred that no time slot is used simultaneously for two SAN-to-UT links. For example, an acceptable link pair would comprises $b_{11}$–$t_1$, $b_{21}$–$t_3$, $b'_{12}$–$t_2$, $b'_{22}$–$t_4$. Each such link pair is used by a different channel. For transmissions to the UT 5, the same information is transmitted in both SAN-to-UT links and, for transmissions from the UT 5, one of the corresponding UT-to-SAN links is selected.

Communication between the SAN 1 and the UT 5 will now be described using, by way of example, the link pair comprising $b_{11}$–$t_1$, $b_{21}$–$t_3$, $b'_{12}$–$t_2$ and $b'_{22}$–$t_4$.

During set up of a call between the UT 5 and another subscriber via the SAN 1, during handover between cells and during handover between satellites, the satellite network control system allocates a channel, i.e. the link pair, to be used between the SAN 1 and the UT 5. The other subscriber may be the user of another UT, the user of a telephone connected to the PSTN, the user of a terrestrial cellular telephone etc.

During communication from the other subscriber to the UT 5, the SAN 1 transmits the information signals, generated by the other subscriber, in $b_{11}$–$t_1$ and $b'_{12}$–$t_2$. The UT 5 listens for both transmissions and determines which provides the best quality link from the SAN 1. If the UT 5 determines that the transmission in $b_{11}$–$t_1$ is the better, the information signal generated by the UT's user is transmitted only in $b'_{12}$–$t_2$. However, if the converse is the case, the UT 5 transmits only in $b'_{22}$–$t_4$. The SAN 1 listens for transmissions in both $b'_{12}$–$t_2$ and $b'_{22}$–$t_4$, determines which slot contains a user-generated information signal and outputs the user-generated information signal for transmission to the other subscriber.

The structure and operation of the UT 5 will now be described.

Figure 3:
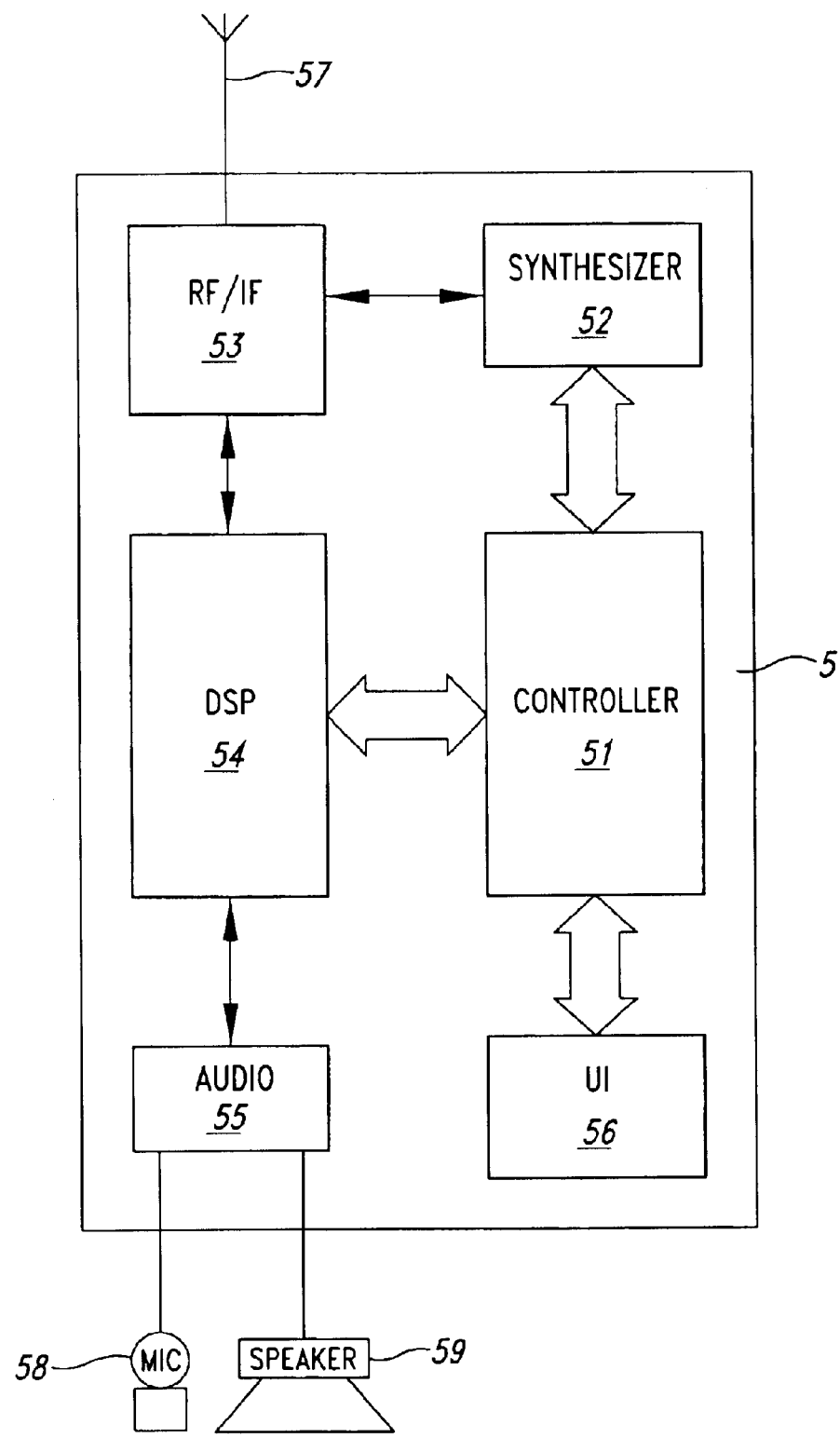
FIG. 3 is a block diagram of the mobile telephone of FIG. 1.

Referring to FIG. 3, the UT 5 comprises a controller 51, a digital frequency synthesizer 52, an RF/IF module 53 including front end, IF, modulator and RF power amplifier circuitry, a digital signal processing (DSP) module 54, an audio module 55, a user interface module 56 including a display and a keypad, an antenna 57, a microphone 58 and a loudspeaker 59. The operation of the UT 5 is controlled by the controller 51 in dependence on a program stored therein, user commands input my means of the user interface module 56 and control signals received from the SAN 1 in a control channel.

The frequency synthesizer 52 is linked to the controller 51 and receives frequency setting commands therefrom. The frequency synthesizer 52 responds to these commands by outputting a sinewave signal to the RF/IF module 53. This sinewave signal is used either to provide a carrier for transmission or a local oscillator signal for reception.

Signals received by the receiver module 53 are demodulated and output to the DSP module 54. The DSP module 54 performs decoding and time expansion of the received signal and, if the signal is an information signal, applies the decoded signal to the audio module 55 which amplifies it and applies it to the loudspeaker 59. The DSP module 54 also outputs a bit error rate (BER) value for the currently received signal to the controller 51.

Speech signals sensed by the microphone 58 are amplified by the audio module 55 and applied to the DSP module 54. The DSP module 54 time compresses and error-correction encodes the speech signal. The resultant signal is applied to the RF/IF module 53 where it is used to modulate the carrier from the frequency synthesizer 52.

Figure 4:
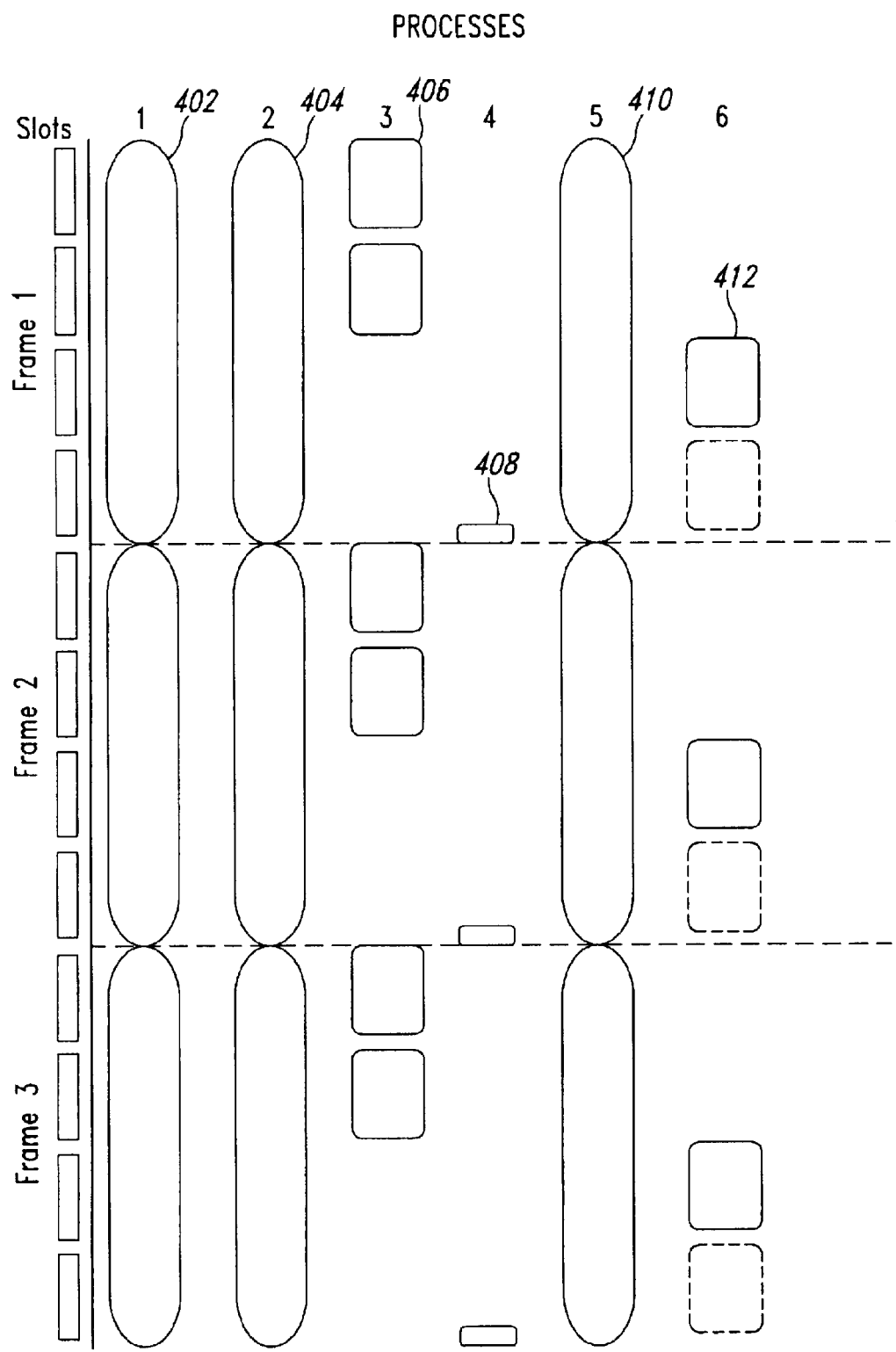
FIG. 4 is a timing chart illustrating the operation of the mobile telephone of FIG. 3.

Referring to FIG. 4, time is shown by the vertical axis and the various processes carried out by the DSP module 54 and the controller 51 are distributed along the horizontal axis.

Process 1 402 is performed by the DSP module 54 and comprises digitizing speech sensed by microphone 58 and storing the resultant digital data. This process 402 last for the duration of one TDMA frame and is repeated for each TDMA frame.

Process 2 404 is also performed by the DSP module 54 and comprises coding the digitized speech, produced in the preceding frame, and storing the resultant signal. The coding enables one frame's worth of speech to be transmitted in one slot and also adds error correction, for example, Viterbi coding.

In process 3 406, the controller 51 outputs frequency control data to the frequency synthesizer 52 so that the RF/IF module 53 tulles to the frequencies of the two slots used by the channel/link pair allocated to the UT 5. The DSP module 54 receives demodulated digital signals, received by the RF/IF module 53. The incoming signals are error-correction coded and the DSP module 54 decodes the incoming signals to produce time-compressed, error-corrected audio signals and a value for the BER of the incoming signals. The BER values are sent to the controller 51.

Process 4 408 is performed by the controller 51 and comprises determining the lower of the two BER values.

In process 5 410, the controller 51 instructs the DSP module 54 to expand the compressed audio data, received in the preceding frame and to which the lower BER relates. The DSP module 54 converts the digital audio signal to an analogue signal and applies it to the audio module 55 for output to the loudspeaker 59.

In process 6 412, the controller 51 instructs the DSP module 54 to output coded speech signals to the RF/IF module 53 for transmission to the SAN 1. The coded speech is transmitted in the band/slot combination paired with that producing the lower BER in the preceding frame. The controller 51 also applies the appropriate frequency control data to the frequency synthesizer 52.

The SAN 1 will now be described in more detail.

Figure 5:
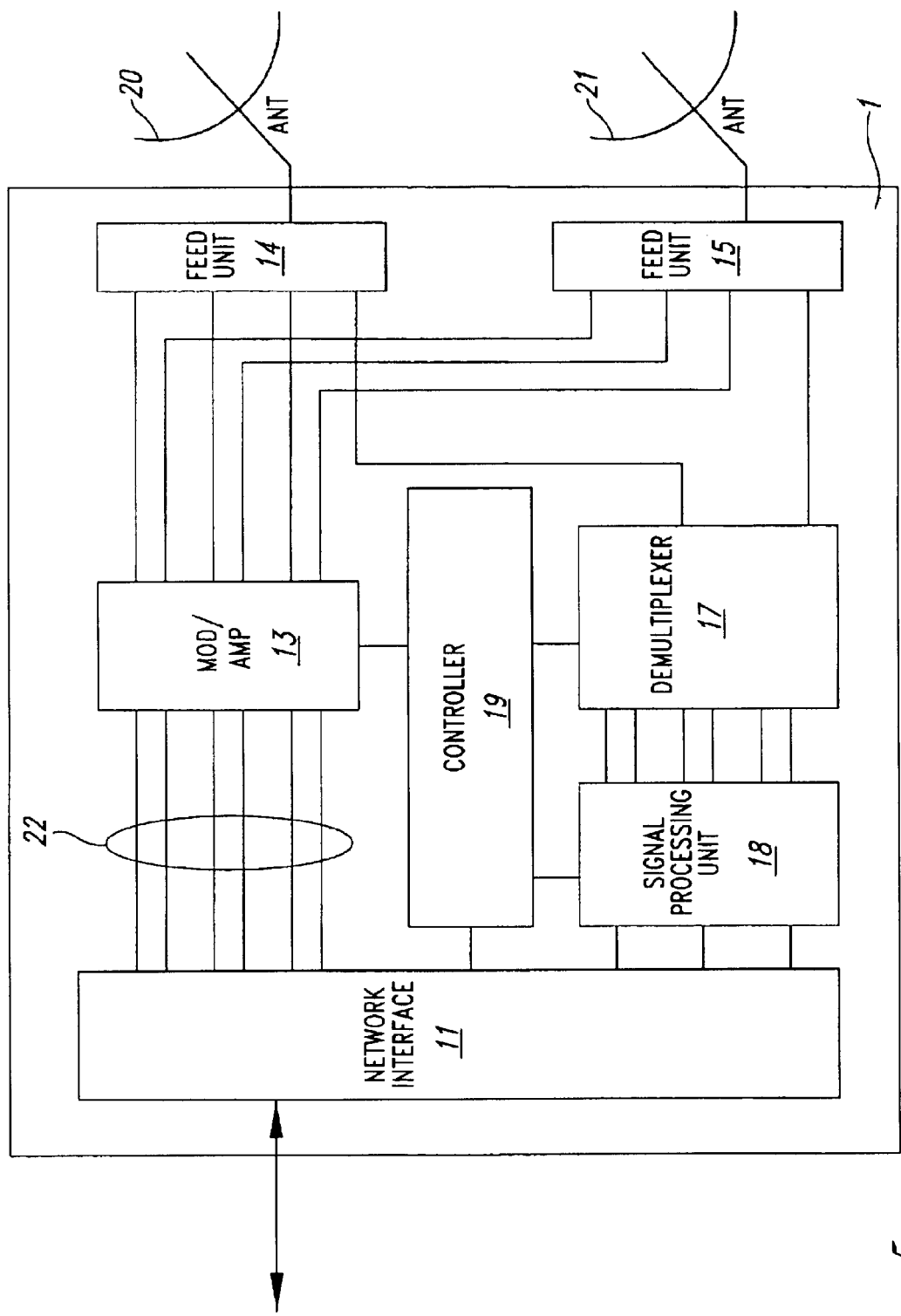
FIG. 5 is a block diagram of the satellite access node of FIG. 1.

Referring to FIG. 5, the SAN 1 comprises a network interface 11 providing an interface to the high-speed terrestrial network 2, a modulator/power amplifier system 13, first and second feed units 14, 15, a demultiplexer 17, a signal processing unit 18, a controller 19 and first and second dish antennas 20, 21.

The interface 11 receives information signals from the high-speed terrestrial network 2 and reformats them from transmission to UTs. The information signals belong to different calls being routed through the SAN 1. The interface 11 combines the data of four calls into a single data stream for modulating a transmitter. However, the data of each call is included in two of the data streams. Each of lines 22, from the interface 11 to the modulator/power amplifier system 13, carries one of these data streams. The modulator/power amplifier system 13 comprises a carrier generator and a modulator for each of the sub-bands $b_{11}$, $b_{12}$, $b_{13}$, $b'_{11}$, $b'_{12}$, $b'_{13}$. The modulator outputs are amplified and supplied to the feed units 14, 15, the signals in sub-bands $b_{11}$, $b_{12}$, $b_{13}$ going to the first feed unit 14 and the signals in sub-bands $b'_{11}$, $b'_{12}$, $b'_{13}$ going to the second feed unit 15. The feed units 14, 15 each include power combiners for combining the signals from the modulator/power amplifier system 12 and a circulator for isolating the demultiplexer 17 from the combined signal and directing the combined signal to the respective antenna 20, 21.

The timing of the TDMA bursts generated by the the modulator/power amplifier system 12 is controlled by the controller 19. The bursts must be timed so that they reach the intended UT 5 in the correct positions within the TDMA frame, regardless of the route taken, i.e. via the first satellite 3 or the second satellite 4.

The signals radiated from the first antenna 20 are relayed to the UT 5 by the first satellite 3 and the signals radiated from the second antenna 21 are relayed to the UT 5 by the second satellite 4.

The UT 5 transmits back to the SAN 1 via only one of the satellites 3, 4. However, the SAN 1 does not know which route will be used in advance.

The signals received by both antennas 20, 21 are routed by the circulators in the feed units 14, 15 to the demultiplexer 17. The demultiplexer 17 comprises a plurality of receivers tuned repectively to sub-bands $b_{21}$, $b_{22}$, $b_{23}$, $b'_{21}$, $b'_{22}$ and $b'_{23}$. Six data streams containing the data received in respective sub-bands $b_{21}$, $b_{22}$, $b_{23}$, $b'_{21}$, $b'_{22}$ and $b'_{23}$ are output by the receivers.

The demultiplexer outputs are applied to the signal processing unit 18. The signal processing unit 18 extracts the data from the slots in the data streams, decodes it and produces a BER value for each slot. The BER values for the corresponding slots of each link pair are compared (an empty slot will generate a very large BER value) and the decoded data from the slots having the lower BERs are output to the interface 11.

The interface 11 reformats the data from the signal processing unit 18 into packets from transmission, via the high-speed terrestrial network and the public network, to the relevant parties.

The restrictions on the bandwidth available for mobile telephone systems mean that a service operator must carefully balance the competing requirements of capacity and link quality. Users will become disillusioned if they find that they cannot make calls at will or if the speech quality is poor. The ability to make calls at will is generally more important to users than speech quality. The purpose of the present invention is in part to maintain speech quality by minimizing lost frames. However, in the embodiment described above, this is achieved at the cost of halving the capacity of the mobile telephone system.

A second embodiment will now be described, in which diversity is employed to maintain speech quality until the user demand reaches a threshold level, whereupon speech quality is sacrificed in favour of expanding the capacity of the system.

Referring again to FIGS. 1 to 5, during periods of low demand the SAN communicates with UTs as described above. However, if the demand increases to a threshold level, for example when 5% of attempted connections using the link between the SAN 1 and the UT 5 cannot be made because of lack of available channels, the network control systems issue a command to the SAN 1 to cause it to switch to a conventional mode of operation. The SAN 1 passes on this command to each of the UTs 5 which are registered with it. In the conventional mode of operation, each channel makes use of a single satellite 3, 4.

In response to this command, the UT 5 ceases to compare BERs for link pairs and listens to only one band-slot, for example $b_{12}$–$t_3$. The band-slot in which the UT 5 transmits is determined on the basis of the receive band-slot and a channelization scheme, and may be, for example, $b_{22}$–$t_1$. The same satellite, e.g. the first satellite 3, is used for communication both to and from the UT 5.

The SAN 1 of this embodiment is substantially the same as that described above with reference to FIG. 5. However, its operation is somewhat different.

As in the case of the UT 5, the SAN 1 operates as in the first embodiment until it receives a command from the network control systems. In response to this command, the controller 19 instructs the interface 11 to apply the data for each call to a single time slot in only one of the data streams.

Under the control of the controller 19, the signal processing unit 18 forwards all the received data to the interface 11. However, signal processing unit 18 continues to determined BER values and these are used by the controller 19 in the allocation of channels to calls. For instance, if the BER of a channel increases beyond a threshold, it may be advantageous to switch a particular call to a channel using the other satellite.

In a further embodiment, the SAN-UT link is switched between conventional and diversity modes on the basis of the positions of the satellites 3, 4. The positions of the satellites 3, 4 are known to the network control systems. When one of the satellites 3, 4 drops towards the horizon, there is an increased likelihood that TDMA slots will be lost due to noise or obstacles in the transmission path. Accordingly, the network control systems commands the SAN 1 to use the conventional mode when the satellites 3, 4 are both substantially overhead but as one drops close to the horizon, the network control system instructs the SAN 1 to use the diversity mode. This instruction may be overriden if the demand for calls through the SAN increases as in the second embodiment.

Although the present invention has been described with reference to a satellite mobile telephone system, it may be applied to other communications systems. For instance, radio coverage of a region may be provided by two spaced base stations. In this case, a control centre would send call data to both base stations for transmission. Then only the base station receiving call data from the mobile station would send call data to the control centre. In other words, the base station to mobile links would be equivalent to the satellite-to-UT links and data network links would substitute for the SAN-to-satellite links.

The bit error rates, referred to above, are used as an indicator of link quality. It will be appreciated that other measures of link quality, e.g. signal-to-noise ratio, may generally be used instead.

What is claimed is:

1. A method of operating a TDMA mobile station so as to transmit speech in a return path channel corresponding to the better of two forward path channels, the method including:

during one frame's duration, digitizing user speech and storing the resultant digitized user speech data;

during one frame's duration, coding digitized user speech data, produced in the preceding frame and storing the encoded digitized user speech data;

tuning to receive bursts from two paths and then demodulating the bursts;

decoding the demodulated bursts to produce time-compressed, error-corrected audio data and a value for the BER of each said burst;

comparing the BER values to determine the lower at the end of a frame;

expanding the time-compressed audio data, received in the preceding frame to which the lower BER relates;

converting the expanded audio data into an analogue signal and generating an acoustic signal in dependence thereon; and transmitting the encoded digitized user speech data via the return path corresponding to the forward path followed by the burst having the lower BER in the preceding frame.

2. A method according to claim 1, wherein the user speech is digitized by a DSP module provided in the mobile station.

3. A method according to claim 1, wherein the digitized user speech data is coded by a DSP module provided in the mobile station.

4. A method according to claim 1, wherein said tuning is performed by outputting from a controller, provided in the mobile station, frequency control data to a frequency sythesizer, provided in the mobile station.

5. A method according to claim 1, wherein the decoding is performed by a DSP module provided in the mobile station.

6. A method according to claim 1, wherein said comparing of BER values is performed by a controller provided in the mobile station.

* * * * *